United States Patent [19]
Ruth et al.

[11] Patent Number: 5,421,447
[45] Date of Patent: Jun. 6, 1995

[54] HIGH RATE TRANSFER WHEEL FOR ORIENTING UNSCRAMBLED CONTAINERS

[75] Inventors: Michael A. Ruth, Chester Springs; Joseph G. Ziegler, Birdsboro, both of Pa.

[73] Assignee: Omega Design Corp., Lionville, Pa.

[21] Appl. No.: 864,790

[22] Filed: Apr. 7, 1992

[51] Int. Cl.6 .............................................. B65G 47/24
[52] U.S. Cl. ................... 198/377; 198/395; 198/471.1
[58] Field of Search ............... 198/377, 378, 395, 400, 198/471.1, 803.5

[56] References Cited

U.S. PATENT DOCUMENTS

| | | | |
|---|---|---|---|
| 1,887,211 | 11/1932 | Mortimer | 198/471.1 |
| 2,813,505 | 11/1957 | Eirinberg | 198/377 |
| 3,618,742 | 11/1971 | Blanchard et al. | 198/395 |
| 4,582,201 | 4/1986 | Taniguchi et al. | 198/377 |
| 4,655,338 | 4/1987 | Hershey et al. | 198/395 |
| 4,684,307 | 8/1987 | Lattion et al. | 198/395 |
| 4,706,797 | 11/1987 | Carlson | 198/395 |
| 4,938,337 | 7/1990 | Jowitt et al. | 198/377 |

*Primary Examiner*—Joseph E. Valenza
*Attorney, Agent, or Firm*—Eugene E. Renz, Jr.

[57] ABSTRACT

A synchronized rotary transfer wheel for orienting containers that have been unscrambled with a pocketed disc sorter type machine. The transfer wheel utilizes momentary air pressure and an adaptive vacuum pick up assembly to grasp, rotate, and release containers that may have a relatively wide variance in width and taper; without requiring change-over parts. The vacuum cups that are used to grasp the individual containers are moved forward and backward by a constant pressure momentary activator along radials on the wheel, to automatically adjust to accumulative radial variances of the machine and the containers. The coaxial parts that are incorporated in the vacuum pickup assembly are light enough in weight to grasp and rotate containers at high rates with relatively small electromechanical rotating devices; which are incorporated into radial modules on the transfer wheel.

3 Claims, 4 Drawing Sheets

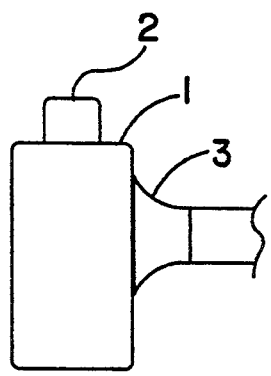
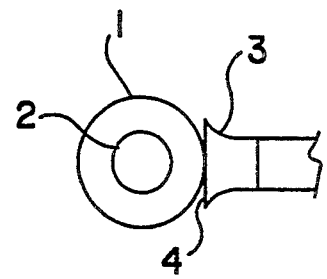
FIG. 2A
PRIOR ART
FIG. 2B
PRIOR ART
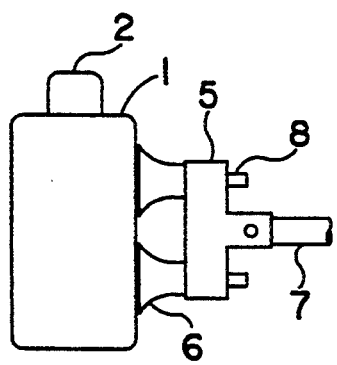
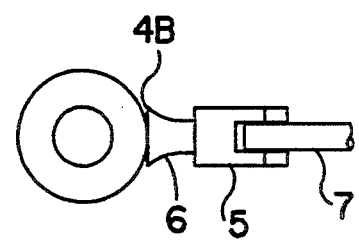
FIG. 3A
FIG. 3B
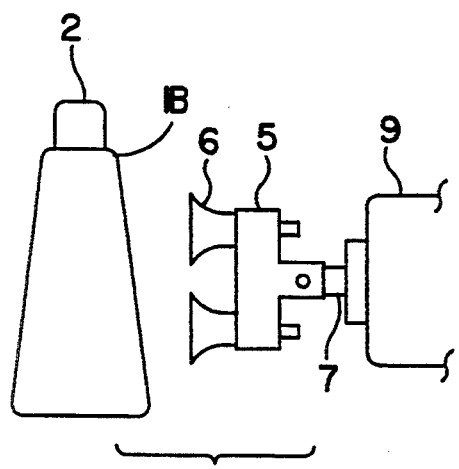
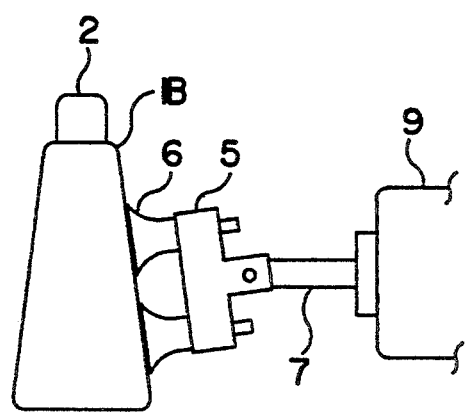
FIG. 4A
FIG. 4B

HIGH RATE TRANSFER WHEEL FOR ORIENTING UNSCRAMBLED CONTAINERS

This invention is in the field of container unscramblers and, in particular, pertains to new and useful improvements on a vacuum rotary orientation wheel which transfers and rotatively positions containers from a pocketed disc sorter type machine and synchronously delivers the containers to a horizontal conveyor, at very high transfer rates.

The invention is a logical extension of Omega Design Corps issued patent, U.S. Pat. No. 4,655,338, which claims the rotary transfer wheel, with mechanical means to grasp containers from a first conveyor, and then rotating the containers to specific positions in a vertical plane; before delivering the containers to a moving conveyor.

State of the art in this class of machines is now demanding higher and higher handling rates which, in turn, add additional demands and closer tolerances to the methods that are presently being used for grasping, handling and releasing the containers. The limitations of present methods when applied to higher handling rates, are presented in the BACKGROUND and the LIMITATIONS OF PRIOR ART sections below; and are associated with the objectives of the invention.

BACKGROUND

The rotating wheel, as a transfer device that synchronously meshes with with one moving conveyor and transfers objects to another conveyor, has been used extensively, because it provides positions or "stations" for accomplishing operations on the objects, while allowing the operating mechanisms to remain stationary to the objects while they are still on the transfer wheel.

Both mechanical grasping devices and vacuum operated suction cups have been used to pick up and release the containers on rotating transfer wheels. Both of these general methods must be accomplished with synchronism of movement at the point where the stations on the perephery of the tranfer wheel mesh with stations on both the delivery and pick up conveyor systems. When designing similar systems to operate at higher transfer rates, all of the timing, grasping, releasing, and tolerance problems are greatly amplified. This is particularly true when using the more gentle and less abrasive vacuum cup grasping method.

It is, therefore, one major object of this invention to provide a sensor activated impulse means to move accurately define the synchronizing of the pick up and release points for a very high rate transfer wheel; when utilizing the vacuum grasping method for rotating containers.

When using suction cups for grasping the containers at the stated radial mesh points, the vacuum cups must go through a deformation or compliance to the curved surface of the container that is to be picked up; which requires relatively fine adjustment of all the radial assemblies on the wheel; by (1) adjusting the radius of all the radial mounted pick ups, or (2) moving the whole wheel assembly toward or away from the mesh points with the first and second horizontal conveyors; which can be interactive if both parallel conveyors are fixed.

It is, therefore, another object of this invention to provide a simple "automatic" means to momentarily adjust to a wider range of accumulative tolerances in the size of the containers, the individual radial pick up arms, and the retaining structure on the conveyor belts; to enable higher pick up and release rates.

The compliance or deforming of typical suction cups, when radially meshing with a curved container surface to obtain a vacuum seal, can require relatively large movements of air to help draw the non conforming lips of the vacuum cups to the curved surface. Large movement of controlled air become a limitation to faster timing; for pick up and release of the containers at the higher operating rates.

It is, therefore, still another object of this invention to provide a means of adding a sensor activated means for momentarily applying an impulse of controlled pressure on the vacuum cups, at the meshing point of the vacuum cups with the face of the containers, to force a quick but gentle full contact and vacuum seal; which enables lower volumes of vacuum and air pressure to be quickly controlled during the pick up and release of containers at the higher transfer rates.

When containers are not of uniform width from top to bottom (having a tapered front panel) the problems of acquiring a full contact and seal of the vacuum cup pickups is further magnified; and especially at higher transfer rates.

It is, therefore, yet another object of this invention to provide, with a momentary compensating feature of the vacuum pick up, a means to automatically adjust to containers with a tapered front panel; as well as a range of widths.

In the general field of container unscramablers and handlers, it is a highly desirable feature to design the machinery to have a minimum amount of parts to change, when switching from one sized container to another; since the multiple parts; the labor; and the downtime; are all expensive to the end user.

It was a additional objective in utilizing vacuum pickup of the containers, to incorporate simple coaxial elements for rotating the container while on the transfer wheel. The parts are economical to produce; have a minimum of weight and inertia at the higher rates and, consequently, are adaptable to being directly driven by electronically programmed stepping motors for any rotation angle. The above elements, including a momentary air driven contact feature, combine to cover a wide range of adaptations, without change-over parts or multiple fine adjustments on the rotary orientation wheel.

THE LIMITATIONS OF PRIOR ART

The principal prior art patents that are pertinent to the new art of this invention are U.S. Pat. No. 4,655,338, issued Apr. 7, 1987, which is the new assignees prior patent; and some of the prior art cited against it. In addition, there is the more recently issued U.S. Pat. No. 5,058,731, with some of its cited prior art; which was assigned to Agionaria Costruzione Macchine Automatiche, of Bologna, Italy.

The Omega Design Corp. Hersey patent, U.S. Pat. No. 4,655,338, introduces the concept of a vertical plane rotation and orientation of containers on a transfer wheel, which is fed by a transfer cage that is located between the disc sorter and the transfer wheel. The patent claims grasping arms to pick up and deliver the unscrambled containers; and utilizes photo sensing of the container positions to activate the rotating mechanisms on the transfer wheel, to orient the container to the desired vertical angle; and deliver the containers continously, at relatively high rates, to the receiving conveyor.

This patent does not anticipate the use of vacuum pick-ups for more gentle handling of the containers, or the techniques that are incorporated in the vacuum pick up assemblies of new the invention; which are designed to eliminate many mechanical adjustments or change overs, and permit very high transfer rates without sacrifice of placement accuracy.

The Baader patent, U.S. Pat. No. 2,693,872, issued Dec. 20, 1951, which was cited against the Hershey patent, is of interest, because it provides a rack and pinion horizontal orientation of an object on a rotating wheel; however, it does not act as a transfer wheel between two conveyors; and it is not, by nature, adaptable to high rate processing of containers.

The more recent Corniani patent, U.S. Pat. No. 5,058,731, issued Oct. 22, 1991, shows a wheel with radial positions that utilize conventional vacuum suction cups to pick up and deliver containers, between one conveyor system and another; but without in process rotation or orientation. The claims do not anticipate rotary orientation during the transfer process, or any in-process sensing to carry out final adjustments of the containers before delivery to the second conveyor.

The patent is pertinent in that it recognizes the necessity of providing fine adjustment of all the radial vacuum pick ups, for successful operation when the stations mesh with the synchronized input and output conveyors. The patent provides a very elaborate mechanical system to simultaneously move all of the radial arms supporting the vacuum pick ups; as an adjustment to allow a range of container widths to be used, without changing parts of the machine.

In addition to not providing in-process rotation or orientation of the containers, the above system does not address individual variances, or cumulative tolerances of the radial arms, pick-up cups, and conveyor stops; which can vary with the multiple radial arms. It also does not provide in-process momentary correction for tapered container shapes. All of the above shortcomings have been overcome by the new invention, with greater simplicity.

The Laidig patent, U.S. Pat. No. 3,208,602, issued Mar. 11, 1964, is cited under Jackson patent, U.S. Pat. No. 3,834,522; which is cited under the Corniani patent. The Laidig patent is of interest since it shows a transfer wheel utilized for carrying out manufacturing steps on an object, while the object is held by arms on the wheel. The system recognizes the close tolerance problem of meshing with the delivery and pickup conveyors, by utilizing elaborate sliding arms on the radial stations, which are, one by one, moved outward with a mechanical cam at the load and unload points. This is a function that is performed on the new invention with a simple air operated movement, that provides constant pressure, and individual momentary adjustment for each individual radial vacuum pick up assembly, as the situation requires.

The simplicity and automatic adjustments provides by the vacuum pick up assemblies of the new invention, will become clear with reference to the following figures, operating description, and appended claims.

THE DRAWINGS

FIGS. 2A and 2B show the problem of making a single large vacuum disc conform and seal to a round container surface.

FIGS. 3A and 3B show the advantage of using two smaller vacuum discs for easier horizontal conforming to the container radius. They also show the leverage distance between the vacuum discs, which provides greater resistance to the rotational inertia at higher impact and rotational rates.

FIGS. 4A and 4B show the vertical slope conforming ability of the dual vacuum cup assembly, which is pivoted to allow it to tilt when momentarily moved forward to engage the surface of the container, with a small amount of constant pressure.

Figure 5:
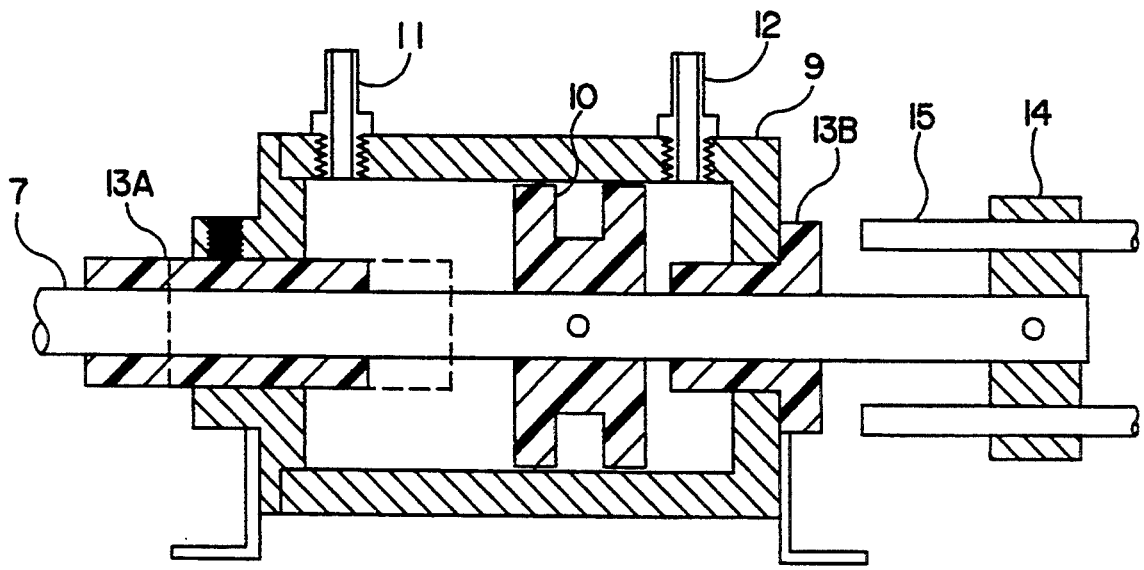

FIG. 5 shows a detail of the small pressure impulse cylinder (approximately actual size) which is used to momentarily, and on command, to move the dual vacuum disc assembly forward until it engages and presses to the container surface; with simultaneous application of vacuum to the suction discs. Switching the vacuum to pressure, while switching the pressure inlets to the air cylinder, quickly releases the vacuum disc assembly, at higher rates.

Figure 6:
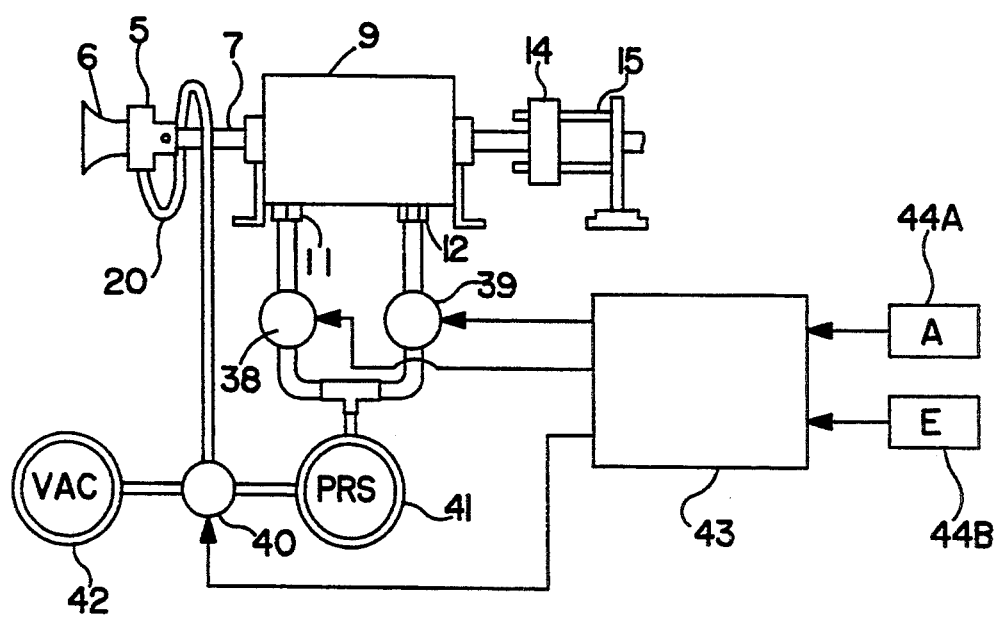

FIG. 6 shows the use of small solenoid operated air valves to control the individual vacuum disc assemblies, from sensor inputs at pick-up position A and delivery position E.

Figure 7:
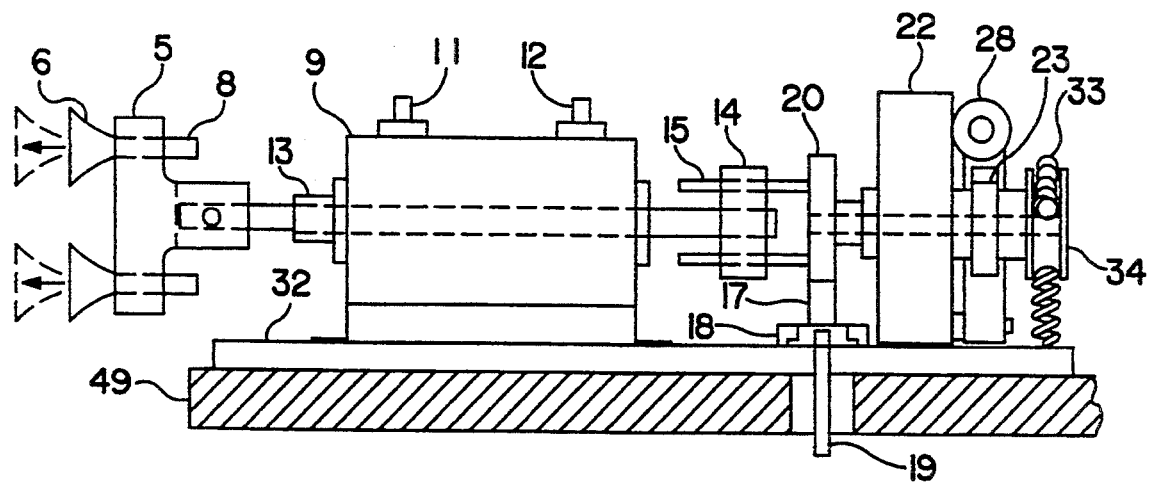

FIG. 7 shows the incorporation of the self adjusting vacuum pickup assembly and the associated pressure impulse cylinder into a radial module, which includes a small rack and pinion gear assembly; which can be activated to move to two individual stop points, when tripped by electrically controlled pawls at two operation station locations. The angle of rotation is set by a digital line counter switch, which releases the pawl and allows a stop disc to accurately maintain the selected angle. The electrical programming includes a Return to Zero Reset, which allows small external vacuum lines to be used on the vacuum pick-up cups, without winding-up beyond 270 degrees.

Figure 8:
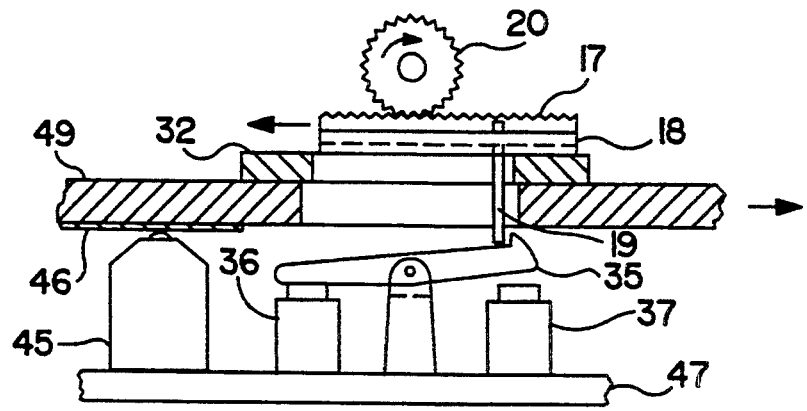

FIG. 8 shows a side view detail of a rotation station pawl assembly, which is electrically controlled and engages the trip pin on the rack of the pinion gears as they pass that particular station. The pawl initiates the rack and pinion movement, which rotates the container; and the photo counter switch releases the pawl and sets the limit of rotation, which is then accurately retained by the stop disc.

Figure 9:
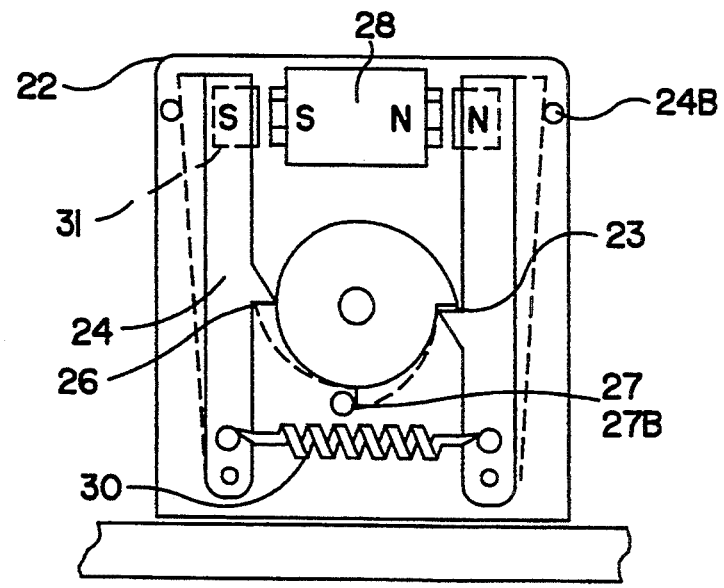

FIG. 9 shows a detail of the pinion gear stop disc, which accurately maintains the the 90 degree and optional 270 degree stop positions; and prevents the wind-up spring from resetting the attached pinion to the zero position, until after the attached container has been ejected at position E.

OPERATIONAL DESCRIPTION

The general purpose of this invention, and its supporting components, is to enhance the use of vacuum type pick-ups at high rates; for handling containers that have gone through a first unscrambling stage, and are then synchronously transferred to a rotary orientation wheel; where they are rotated, as needed, before being synchronously released to a horizontal conveyor. The general operation of grasping and rotatively orienting the containers on a synchronized transfer wheel, has been shown by our patent, U.S. Pat. No. 4,655,338.

In particular, the invention has addressed and overcome some of the basic constrains when using vacuum cup pick-ups at the higher production rates, which can make the tolerances of all the operations more demanding; and require the use of momentary non-programmed adjustments. Some of these in-process adjustments are "automatic", and others are controlled by in-process sensors, which add "stabilizing feedback".

Figure 1:
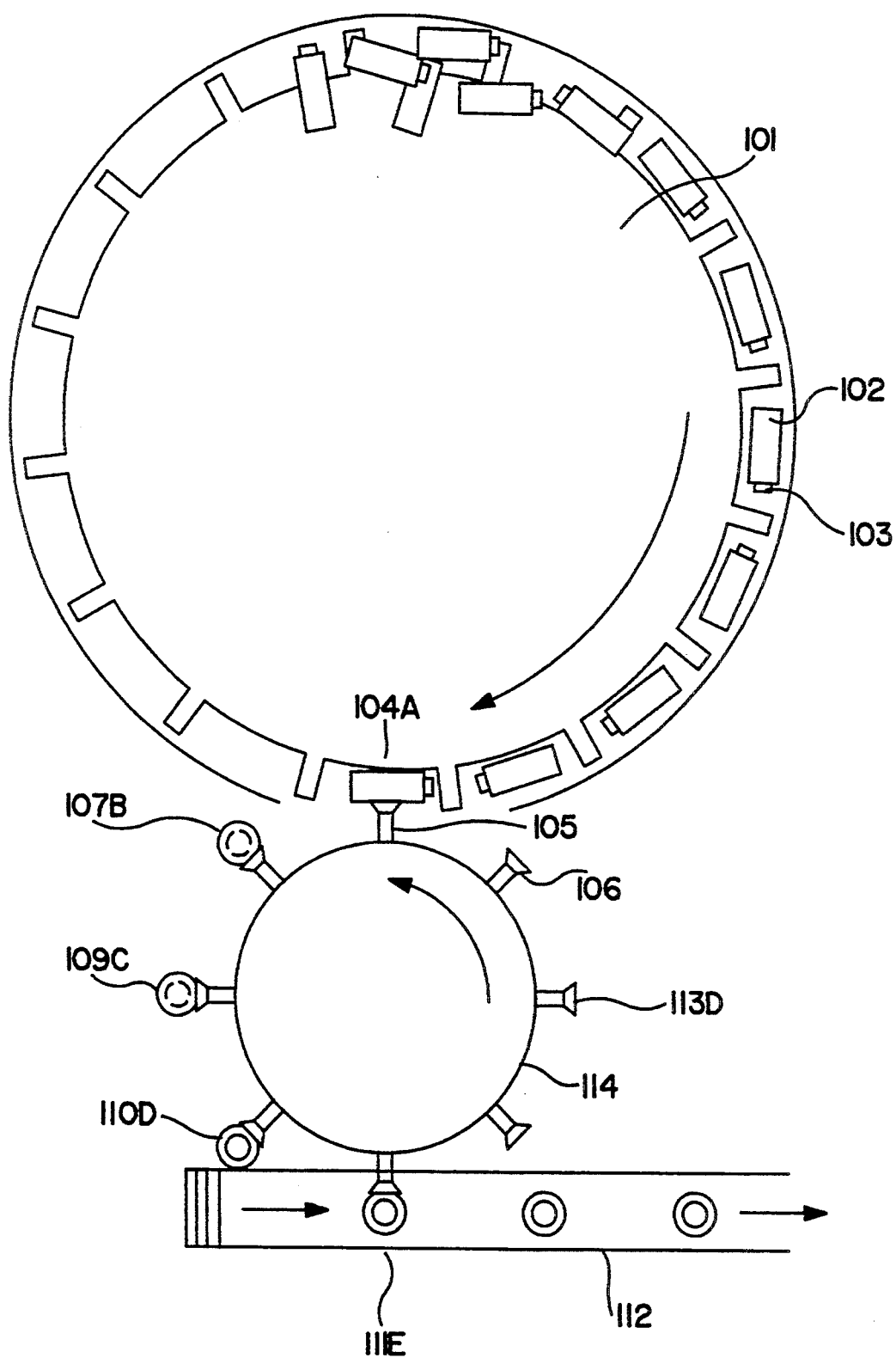
FIG. 1 shows the general configuration of an unscrambler conveyor meshing with a transfer wheel, which, in turn, meshes with a second horizontal conveyor. Operational positions are shows as locations A through E.

With reference to FIG. 1, the basic transfer system is shown. The outer conveyor 101 of the pocketed disc sorter is shown with unscrambled containers 102, which have the cap ends 103 still disoriented. When the containers 102 reach the A position 104 they are synchronized, by the controlled rotation rate of the rotary transfer wheel 114, to meet the suction cups 106, which are mounted on a radial arms 105.

As the rotary transfer wheel 114 continues to rotate, the container may be rotated in a vertical plane at B station 107, from the original position at A station 104. When the container arrives at C station 109, non contacting sensors determine the orientation of the container 102, and provide a command to rotate the container to a predetermined position at the D station 110, if it is necessary; to allign all containers 102 to a specific vertical position, before they are released at E station 111 on the horizontal conveyor 112.

The first problem of accurate synchronized meshing of the radial station 105 on a rotary transfer wheel 114, with the corresponding stations on the unscrambler conveyor 101, can be minimized at high rates by providing a controlled momentary pressure impulse to the vacuum pickup cup 106, when it is exactly adjacent to the container 102. This provides quick and complete contact with the container, under constant pressure; to make the contact point less "blurry", where the paths of the two conveyors meet. The action also assures a complete seal of the vacuum cup 106 to the container 102, so that a minimum volume of vacuum and air pressure may be switched locally to affect very quick adherence to the container, as well as very quick release.

With reference to prior art FIGS. 2A and 2B, a round container 1 is shown with a cap 2, which is being approached with a single large vacuum cup 3. With the size container shown, there is a fairly large deformation of the cup 3 to the horizontal cross section, as shown in FIG. 2B. With a radial drive shaft 8, which is set to an exact length sufficient to deform the suction cup 3 lips 4 around the curved surface of the container, the continuous successful operation of the system depends on the accumulative tolerances of all the parts, which could add up to a worse case condition, when there is no in-process compensation.

FIGS. 3A and 3B show the use of two smaller vacuum cups 6 on a dual cup assembly 5, which is rotatively mounted on a drive shaft 7. The vertical view, FIG. 3B, shows the great reduction in horizontal compliance required for the more narrow cups 6 on the outside radius of the same sized container 1 as shown in FIG. 2A and 2B. It is obvious when observing FIG. 3A that the two small vacuum discs 6 also have a greater leverage about their center of rotation, which resists rotational inertia of the containers 1 when operated at higher rotational rates. When the dual cup assembly 5 is pressed forward momentarily by the shaft 7 there is a minimum deformation requirement for the smaller width cup 6, to produce a seal to the side of the round container 1, because of the minimal width of the two cups.

FIGS. 4A and 4B show the adaptability of the dual vacuum cup assembly 5 to a tapered container face 1B, FIG. 4A shows the assembly 5 before being advanced forward by the air cylinder 9 and the shaft 7. The rotatively mounted dual cup assembly 5 is shown in FIG. 4B as it would quickly adjust to the slope of the container 1B, when it is moved forward by the preset constant pressure of the air cylinder 9.

It is now clear that the grasping of the container 1B by the dual cup assembly 5, with a momentary and controlled forward movement, is not only (1) more accurate for high rate timing, but (2) the applied pressure quickly affects a seal of the suction cups 6, at which time a vacuum is instantly applied, with a small solenoid operated valve, thru the very small volume of the small tubing between the electrically operated valve and the vacuum cups 6.

A small ball detent at the end of the drive shaft 8 can be used to quickly return the vacuum cup assembly to the vertical position, when it is desirable.

FIG. 5 shows a cross section of the actuating air cylinder 9, approximately actual size. There is a forward and a rear air chamber, 11B and 12B, which are fed by air connectors 11 and 12, respectively. A light plastic piston 10 is pinned to the central polished steel shaft 7; and the combination is free to both rotate and slide forward and backward thru the lubrous plastic bearings 13A and 13B, which do not require lubricants. In the design shown, the shaft 8 and attached piston 10 is free to move a full inch between the bearing bushings 13A and 13B. The rear bearing bushing 13B is fixed; while the forward bearing bushing 11A is adjustable to set the limits of travel of the piston 10. between the bushings 13A and 13B. The rear end of the drive shaft 7 has a slide coupling 14 which admits two slide bars 15 from the rotating drive source that is used.

FIG. 6 shows the low volume fast switching system for controlling both the air actuated cylinder 9 and the vacuum cup assembly 5. Small solenoid activated valves 38, 39, and 40 have very fast response, and make us of opposing chambers in the air cylinder, with alternating solenoid valves 38, 39, and vacuum to pressure switching to the vacuum cup assembly 5, via the two way solenoid valve 40. The solenoid valves are very small—only 1"×2" in size, and are located close to the vacuum cup assembly on the radial module; to afford very short flexible tube connections, which retain very low volume of either air pressure or vacuum, for fast switching times; measured in milli seconds.

The solid state control circuitry for the solenoid valves is located on one small module 43, which receives its pick-up and release inputs 44 and 45 from the A position sensor and E position sensor respectively; and produces short impulses for both pick up and release. When the shaft and vacuum cup assembly is moved forward at the pick-up station A, the air pressure required is only in the range of 5 to 10 pounds. Besides gently deforming the vacuum cups to mechanically seal to the container surface, the forward movement obviously becomes an overall adjustment for all accumulative radial variables, within a substantial range; and the contact will be made at exactly the preset pressure, regardless of the distance the vacuum cups have had to travel before contact.

ROTARY ORIENTATION METHODS

With reference to FIG. 7, a small rack and pinion rotational drive assembly is shown, which is a small modularized version of the rack and pinion orientating system disclosed in our prior patent, U.S. Pat. No. 4,655,338. The small light weight parts associated with the vacuum cup air cylinder assembly 9, enable the use of relatively small rack 17 and pinion 20 gears, with a small solenoid operated stop disc assembly 22; which is contained on a quickly replaceable radial module base 32. The radial modules are mounted on the rotating transfer wheel 49; and there is a small tripping pin 19 extending downward, from the sliding rack gear 17, through slots in both the module base 32 and the transfer wheel 49; to engage a stationary solenoid operated trip-pin mechanism.

The pin 19, extending downward from the rack gear, engages the trip pin pawl 35, which is activated by an engage solenoid 36, located on a stationary platform beneath the rotating tranfer disc 49. The rack 17 and pinion gear 20 are designed to rotate as much as 270 degrees. With reference to FIG. 8, the limit of rotation is set by a sensor, such as the digital counter switch 45, which can be set to any desired angle, by "measuring" the horizontal movement of the transfer wheel 49, after the trip pawl 35 has engaged the trip pin 19; and before it is released by the release solenoid 37.

The sensor 45 is set, in the configuration that is shown, to allow rotation of 90 degrees and, conditionally, an additional 180 degrees; or a total of 270 degrees. The solenoid operated stop disc assembly 22, as shown in FIG. 9, has a rotary stop disc 23, which is free to rotate counter clockwise past the pawls on the armatures 24; which are located at 90 degrees and 270 degrees of the stop disc rotation. The stop disc 23 is spring loaded in a clock-wise direction by a return spring 33, which winds up around the spring hub 34, as the stop disc 23 and hub 34 are rotated by the rack and pinion movement counter clockwise.

The rotary movements are always preset to extend just beyond the 90 degree or the 270 degree points; and the return spring 33 will quickly return the stop disc 23 to the accurate stop pawl positions on the spring loaded armatures 24. To obtain strong momentary force from the reset solenoid, with relatively wide pole gaps, bucking magnets 31 are attached to the ends of the armatures 24, with the polarities as shown on the drawing. When the double pole solenoid coil 28 is not energized the bucking magnets 31 are both attracted to the solenoid 28 poles, and help to retain the stop disc positions. When energized, both poles of the solenoid are opposing to like poles on the armature bucking magnets 31; driving both armatures 24 outward against the armature stop pins 24B. At that time, both the armature pawls are released from the stop disc pawl, regardless of the disc position, and the wind up spring 33 quickly returns the stop disc 23 and the whole orienting assembly to the 0 degree RESET position 27; against the 0 degree stop pin 27B.

The resetable stop disc assembly releaves high accuracy requirements from the rack and pinion and trip pin mechanisms since the initial rotation need only be on the high side of the required angle. The wind up return spring 33 and hub 34 serve to (1) adjust the main shaft position quickly to the exact angle required and (2) quickly return the entire vacuum pickup assembly 5 to the zero position, after the container 1 has been released at the E position on the transfer wheel 49. This reset function is also essential to the use of short vacuum and pressure tubing to the vacuum cup assembly 5, which must be kept within a 270 degree range for the coiled tubing 20. The use of the short tubing connections, eliminates elaborate concentric slip assemblies with rotating seals; and the greater internal volume, which must be minimized for high rate switching.

SUMMARY

The invention provides, on a rotary transfer wheel, a self adjusting vacuum pickup assembly, with both rotary and momentary Z axis movement; which is capable of synchronously picking up containers from a first moving conveyor; and rotatably orienting the containers to a desired position, before synchronously delivering the containers to a second moving conveyor.

Special features of the unique vacuum pickup system include a constant pressure air activated momentary radial movement of the self adjusting vacuum pickup assembly; to provide better contact and greater "meshing" accuracy at the pickup and delivery points, at higher operating rates. The special adaptability of the new vacuum pickup system also allows a relatively wide range of container sizes and shapes to be handled, without requiring the costly installation of change-over parts.

We claim:

1. A synchronized rotary transfer device having vacuum actuated means for grasping objects from a first location and means to selectively orient the objects to a specific position and maintain said position until the oriented objects are discharged to a second location comprising:
    a) at least one air pressure means for activating a shaft for positioning at least one vacuum actuated cup to synchronously engage and grasp a moving object from said first location;
    b) means mounting the cup on a vacuum actuated cup assembly having means for selectively adjusting the cup position to orient the objects to said position;
    c) said vacuum cup assembly being free to move forward and backwards along a radial axis while slideably coupled to driver means to rotate the shaft to a predetermined position;
    d) means for accurately maintaining said predetermined position until said oriented objects are released from said vacuum cup assembly at said second location by releasing the actuating vacuum to said vacuum cup assembly; and
    e) wherein said air pressure means for actuating said shaft is driven in both a forward and backwards direction by controlled air pressure, to assure that said vacuum cup assemblies make contact with said objects with a constant pressure regardless of the distance said air pressure activated shaft travels to engage the surface of said objects.

2. A synchronized rotary transfer device having vacuum actuated means for grasping objects from a first location and means to selectively orient the objects to a specific position and maintain said position until the oriented objects are discharged to a second location comprising:
    a) at least one air pressure means for actuating a shaft for positioning at least one vacuum actuated cup to synchronously engage and grasp a moving object from said first location;
    b) means mounting the cup on a vacuum actuated cup assembly having means for selectively adjusting the cup position to orient the objects to said position;

c) said vacuum cup assembly being free to move forward and backwards along a radial center while slideably coupled to driver means to rotate the shaft to a predetermined position;

d) means for accurately maintaining said predetermined position until said oriented objects are released from said vacuum cup assembly at said second location by releasing the actuating vacuum to said vacuum cup assembly; and e) wherein said air pressure means for actuating said shaft is slidably coupled to pinion gears which are in turn, selectively rotated by a linear gear rack moved relative to the selective orientation means by a stationary electromechanical catch mechanism which controls the linear movement of said linear gear rack relative to the measured movement of the selective orientation means.

3. A synchronized rotary transfer device having vacuum actuated means for grasping objects from a first location and means to selectively orient the objects to a specific position and maintain said position until the oriented objects are discharged to a second location comprising:

a) at least one air pressure means for activating a shaft for positioning at least one vacuum actuated cup to synchronously engage and grasp a moving object from said first location;

b) means mounting the cup on a vacuum actuated cup assembly having means for selectively adjusting the cup position to orient the objects to said position;

c) said vacuum cup assembly being free to move forward and backwards along a radial center while slidably coupled to driver means to rotate the shaft to a predetermined position;

d) means for accurately maintaining said predetermined position until said oriented objects are released from said vacuum cup assembly at said second location by releasing the actuating vacuum to said vacuum cup assembly; and e) wherein said air pressure means for actuating said shaft which are slidably coupled to pinion gears are maintained in said specific positions by a latching stop disc until the delivery of said objects said second location at which time said latching stop disc may be quickly reset to the zero degree position by activating a solenoid to release latching armatures on the stop disc assembly.

* * * * *